May 14, 1963 — P. P. LODA — 3,089,239
COMBINATION NAIL CLIPPER IMPLEMENT
Filed June 22, 1962
FIG. 1
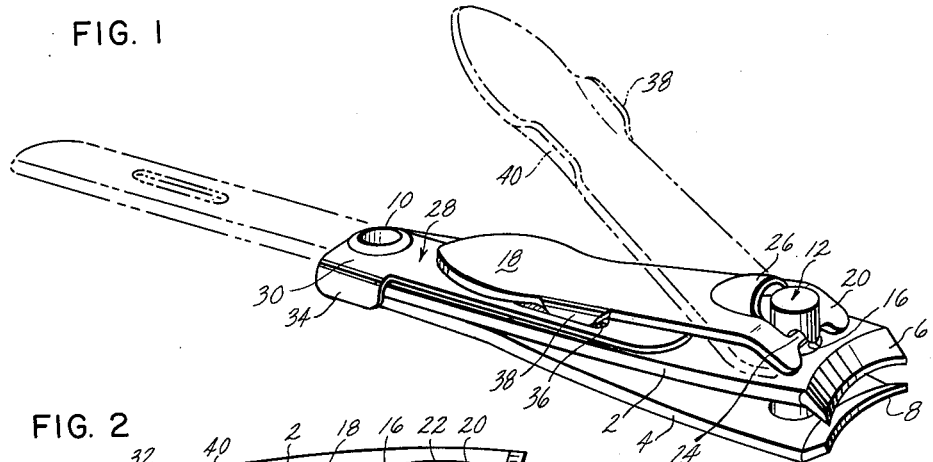
FIG. 2
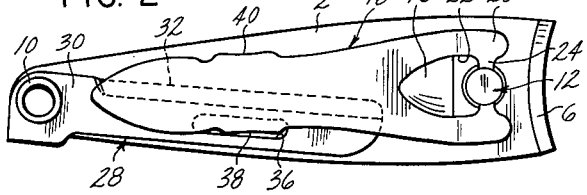
FIG. 4
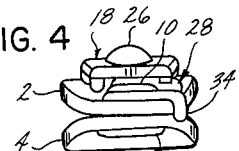
FIG. 3
FIG. 5
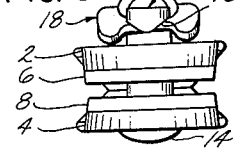
FIG. 7
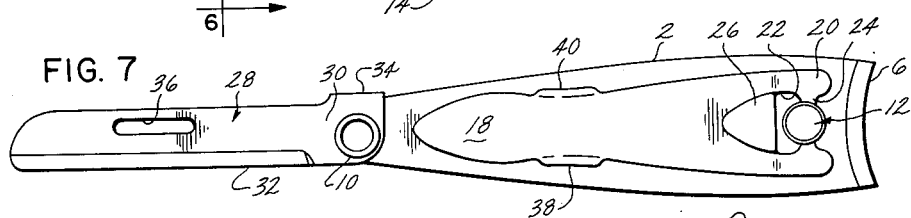
FIG. 8
FIG. 6
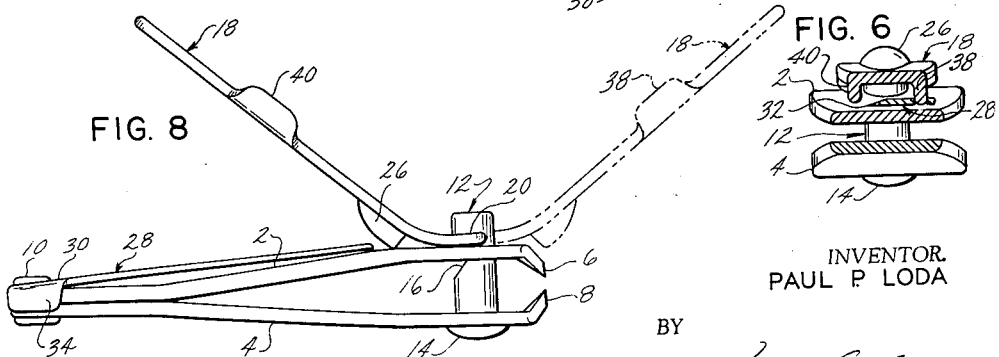
INVENTOR.
PAUL P. LODA
BY
ATTORNEY 3,089,239
Patented May 14, 1963

3,089,239
COMBINATION NAIL CLIPPER IMPLEMENT
Paul P. Loda, Ansonia, Conn., assignor to The H. C. Cook Company, Ansonia, Conn., a corporation of Connecticut
Filed June 22, 1962, Ser. No. 204,446
3 Claims. (Cl. 30—142)

This invention relates to cutting implements and more particularly to an improved combination nail clipper implement having a knife blade.

It is the aim of the present invention to provide a novel combination nail clipper implement having a knife blade which is relatively simple and economical to manufacture, rugged in construction and in which the knife blade will not interfere with the operation of the clippers but will cooperate with the operating lever to maintain the elements in closed position.

Other aims and advantages of the present invention will be readily apparent from the following detailed specification and the attached drawing wherein:

FIGURE 1 is a perspective view of a combination nail clipper implement having a knife blade which embodies the present invention and wherein the operating lever and knife blade are shown in phantom in their respective operative positions;

FIGURE 2 is a plan view of the combination nail clipper implement of FIGURE 1;

FIGURE 3 is a side elevational view thereof.

FIGURE 4 is a rear elevational view thereof;

FIGURE 5 is a front elevational view thereof;

FIGURE 6 is a sectional view along the line 6—6 of FIGURE 3;

FIGURE 7 is a plan view of the implement with the knife blade extended into operative position; and FIGURE 8 is a side elevational view of the implement with the operating lever pivoted into operating position and showing in phantom the operating lever in an intermediate position.

I have now found that a highly effective and desirable combination nail clipper implement having a knife blade can be provided by an assembly wherein a knife blade has its shank portion pivotally mounted upon the fastener holding together the joined edges of the superposed jaw elements of the clipper together to extend along the upper surface of the upper jaw in its inoperative position and has a depending lug on the side edge of the shank opposite the knife edge so that when pivoted into extended or operative position, the lug will hold the knife blade relatively rigid during cutting. The operating lever for the clipper jaws which is pivotably mounted on a pivot pin intermediate the length of the jaw elements adjacent the jaw ends thereof has a depending lug on its side edge spaced from the knife edge intermediate the length thereof which engages in an aperture in the blade to lock the two elements together and restrict relative pivotal movement therebetween, the other side of the operating lever being spaced outwardly from the blade edge to provide a cover for the knife edge of the blade. In the preferred embodiment, a cooperating lug is provided on the edge of the lever opposite the locking lug to space the side of the lever and provide a guard for the knife edge.

Referring now in detail to the attached drawing, the combination nail clipper includes the superposed elongated jaw elements 2, 4 which have cooperating cutter jaws 6, 8 formed at one end thereof and are secured together at the other end in overlying relationship by a rivet or other fastener 10. In accordance with conventional practice, the jaw elements 2, 4 are preferably fabricated of a spring steel and are formed to diverge towards their jaw ends so that the jaws 6, 8 normally will be biased apart, as best seen in FIGURES 3 and 5.

Intermediate the length of the jaw elements 2, 4 and adjacent the end having the jaws 6, 8 is a pivot pin or post 12 which extends through aligned apertures therein. The pin 12 has a head portion 14 at its lower end which abuts against the lower surface of the lower jaw element 4 about the aperture therein and is provided with an upwardly extending undercut notch 16 adjacent the other end thereof which opens towards the cutter jaws 6, 8 in the inoperative position of the clipper.

Pivotally mounted on the pivot pin 12 is the elongated operating lever 18 which is formed with a mounting end portion 20 inclined downwardly with respect to the body of the lever 18, and the mounting end portion 20 has an aperture 22 therein defining the transverse end strap 24. As best seen in FIGURES 1, 3 and 5, the pivot pin 12 extends upwardly through the aperture 22 and the transverse end strap 24 engages in the notch 16 therein with the biasing pressure of the jaw elements 2, 4 maintaining the strap 24 against the upper surface of the undercut notch 16 to hold the lever in assembly upon the pivot pin 12. The body portion of the lever 18 adjacent the aperture 22 is deformed to provide an upwardly extending boss or projection 26 which, when the lever is pivoted about the pivot pin and the pin 12 and lever 18 rotated 180 degrees to the position shown in FIGURE 8, will increase the angle of inclination of the lever 12 relative to the jaw elements 2, 4 to facilitate operation of the lever in closing the jaws 6, 8 against the biasing pressure of the jaw elements 2, 4.

In accordance with the present invention, an elongated knife blade 28 is rotatably mounted on the upper surface of the upper clipper jaw 2 by the rivet 10 which extends through an aperture in its shank portion 30. The blade 28 has a bevelled or sharpened knife edge 32 extending along one side thereof and is provided with an integrally formed depending lug 34 on the other side at the shank portion 30. In the closed or inoperative position, the lug 34 abuts the adjacent sides of the jaw elements 2, 4 to limit rotation of the blade 28 in the direction of the knife edge 32. When rotated 180 degrees about the rivet 10, the lug 34 abuts the opposite sides of the jaw elements 2, 4 so as to prevent further rotation thereof and maintain the blade 28 in extended position during cutting pressure.

As best seen in FIGURES 2 and 6, the blade 28 is of narrower width or transverse dimension than the jaw elements 2, 4 and, as best seen in FIGURE 7, is provided with an elongated aperture 36 located intermediate the ends and adjacent the central portion thereof, which aperture is preferably also located adjacent the side opposite the knife edge 32.

Integrally formed on the lever 18 on its side spaced from the knife edge 32 is a depending locking lug 38 which extends into the aperture 36 of the blade 28 to limit relative pivotal movement therebetween in the closed position.

As best seen in FIGURES 2 and 6, the lever 18 is of sufficient width so that its other side edge is spaced outwardly from the knife edge 32 of the blade 28 to provide a protective cover therefor. A cooperating spacer lug 40 is integrally formed on the side edge of the blade 28 opposite the locking lug 38 to provide a firm level support for the lever 18 in the inoperative or closed position and to provide a guard to limit movement of articles laterally under the lever towards the knife edge.

To use the knife blade 28, the lever 18 is lifted slightly to disengage the locking lug 38 thereof from the aperture 36 in the knife blade 28 and the knife blade 28 is then rotated from the position shown in FIGURE 2 into the extended position shown in FIGURE 7 wherein the lug 34 abuts against the sides of the jaw elements 2, 4 to hold the blade in open position when cutting pressure is applied along the knife edge.

When not in use, the blade 28 is rotated back into the position shown in FIGURE 2 by elevating the lever 18 until the lug 34 abuts against the sides of the jaw elements 2, 4 and the locking lug 38 is inserted into the aperture 36 of the blade 28. In this position, relative pivotal movement therebetween is limited so as to hold the lever 18 and blade 28 in closed position against inadvertent disengagement. In this closed position, the side edge of the lever 18 opposite that having the locking lug is disposed outwardly of the knife edge 32 so as to provide a protective cover therefor, and the spacer lug 40 rides upon the top surface of the upper jaw element 2 to provide a firm spaced support for the lever 18 and a guard limiting lateral access thereunder to the knife edge 32 as pointed out hereinbefore.

To use the nail clipper jaws 6, 8 of the implement, the locking lug 38 is disengaged from the aperture 36 in the knife blade 28, and the lever 18 is pivoted about the pivot pin 12 against the biasing pressure of the jaw elements 2, 4 and rotated 180 degrees into the operating position shown in FIGURE 8. In this position, the ends of the jaw elements 2, 4 having the jaws 6, 8 continue to be biased apart but may be moved together to nip or clip by depressing the outer or free end of the lever 18. In this position, the locking lug 38 and spacer lug 40 cooperate to provide abutments which the user's thumb can rest against and grip to facilitate operation of the lever 18 even when the fingers are moist or wet.

Thus, it can be seen that the present invention provides a rugged combination nail clipper implement having a knife blade which is relatively simple and economical to manufacture and wherein the knife blade and jaw operating lever cooperate to retain themselves in closed position against inadvertent opening and wherein the knife edge is protected to prevent inadvertent cutting.

Although but one embodiment of the invention has been illustrated and described, it will be readily apparent that modifications may be made without departing from the spirit of the invention.

Having thus defined the invention, I claim:

1. A combination nail clipper implement comprising a pair of superposed elongated jaw elements having cooperating cutter jaws at one end thereof; means fastening the other end of said jaw elements, said jaw elements being biased apart to provide yieldable spacing between said cutter jaws; a knife blade extending along the upper surface of the upper of said jaw elements and having a shank portion pivotally mounted on said fastening means, said blade having a cutting edge extending along one side edge thereof and a lug on the shank portion of the other side edge depending along the adjacent side of said jaw elements, said blade having an aperture therein intermediate the length thereof; a pivot pin intermediate the length of said jaw elements and adjacent said one end; and an elongated operating lever for said jaw elements pivotably mounted on said pivot pin and overlying said blade, said lever having a depending lug on its side edge spaced from the knife edge engaged in said aperture of the blade to limit relative pivotal movement therebetween, said lever being dimensioned so that its other side edge is spaced outwardly from said knife edge to provide a protective cover therefor, said blade being pivotable about said fastening means to extend outwardly from said other end of said jaw elements with the lug thereof abutting against the opposite side of said jaw elements to hold said blade in extended position during use thereof.

2. The implement of claim 1 wherein said lever has a second depending lug on its other side edge in transverse alignment with the lug engaged in said knife blade aperture to space said lever and provide a guard for the knife edge.

3. A combination nail clipper implement comprising a pair of elongated jaw elements having cooperating cutter jaws at one end thereof; means fastening the other end of said jaw elements, said jaw elements being of spring metal and biased apart to provide yieldable spacing between said cutter jaws; an elongated knife blade extending along the upper surface of the upper of said jaw elements and having a shank portion pivotally mounted by said fastening means, said blade having a cutting edge extending along one side edge thereof and a lug on the shank portion of the other side edge depending along the adjacent side of said jaw elements, said blade having an elongated aperture therein intermediate the length and adjacent the central portion thereof; a pivot pin intermediate the length of said jaw elements and adjacent said one end; and an elongated operating lever for said jaw elements pivotally mounted on said pivot pin and overlying said blade, said lever having a pair of elongated depending lugs on its side edges in transverse alignment with said aperture of the knife blade, the lug on the side edges of said lever spaced away from said knife edge being engaged within said aperture, said aperture and lug being dimensioned to limit relative movement of the lug therein and thereby to limit relative pivotal movement between said blade and lever, said lever and blade being dimensioned so that the other side edge of the lever is spaced outwardly from said knife edge to provide a protective cover therefor, with the other of said lugs providing a spacer for said lever and a guard for said knife edge, said blade being pivotable about said fastening means to extend outwardly from said other end of said jaw elements with the lug on its shank portion abutting against the opposite side of said jaw elements to hold said blade in extended position during use thereof.

No references cited.